United States Patent
Zeitfuss et al.

(10) Patent No.: US 6,833,811 B2
(45) Date of Patent: Dec. 21, 2004

(54) SYSTEM AND METHOD FOR HIGHLY ACCURATE REAL TIME TRACKING AND LOCATION IN THREE DIMENSIONS

(75) Inventors: Michael P. Zeitfuss, Satellite Beach, FL (US); Joseph M. Nemethy, West Melbourne, FL (US); Joseph A. Venezia, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/265,757

(22) Filed: Oct. 7, 2002

(65) Prior Publication Data

US 2004/0066329 A1 Apr. 8, 2004

(51) Int. Cl.$^7$ .............................................. H04B 7/185
(52) U.S. Cl. .......................... 342/357.07; 342/357.06; 701/213
(58) Field of Search .......................... 342/352, 357.01, 342/357.06, 357.07, 357.12; 701/207, 213, 215

(56) References Cited

U.S. PATENT DOCUMENTS

| | | | |
|---|---|---|---|
| 5,450,329 A * | 9/1995 | Tanner ........................ 364/449 |
| 5,528,518 A | 6/1996 | Bradshaw et al. |
| 5,873,056 A | 2/1999 | Liddy et al. |
| 5,971,595 A | 10/1999 | Grant et al. |
| 6,161,105 A | 12/2000 | Keighan et al. |
| 6,173,287 B1 | 1/2001 | Eberman et al. |
| 6,195,122 B1 | 2/2001 | Vincent |
| 6,222,482 B1 | 4/2001 | Gueziec |
| 6,253,239 B1 | 6/2001 | Shklar et al. |
| 6,281,797 B1 * | 8/2001 | Forster et al. ........... 340/572.3 |
| 6,282,362 B1 | 8/2001 | Murphy et al. |
| 6,285,805 B1 | 9/2001 | Gueziec |
| 6,292,215 B1 | 9/2001 | Vincent |
| 6,304,864 B1 | 10/2001 | Liddy et al. |
| 6,307,573 B1 | 10/2001 | Barros |
| 6,327,533 B1 | 12/2001 | Chou |
| 6,360,234 B2 | 3/2002 | Jain et al. |
| 6,362,775 B1 * | 3/2002 | Goebel et al. ................. 342/64 |
| 6,421,010 B1 * | 7/2002 | Chadwick et al. .......... 342/465 |
| 6,445,983 B1 | 9/2002 | Dickson et al. |
| 6,463,180 B1 | 10/2002 | Krishnaswamy |
| 6,480,789 B2 * | 11/2002 | Lin ............................. 701/301 |
| 6,516,099 B1 | 2/2003 | Davison |
| 6,552,681 B1 * | 4/2003 | Hayward et al. ...... 342/357.06 |
| 6,567,980 B1 | 5/2003 | Jain et al. |
| 6,597,818 B2 | 7/2003 | Kumar et al. |
| 6,681,231 B1 | 1/2004 | Burnett |
| 2001/0038718 A1 | 11/2001 | Kumar et al. |
| 2002/0035451 A1 | 3/2002 | Rothermel |
| 2002/0055924 A1 | 5/2002 | Liming |
| 2002/0118224 A1 | 8/2002 | Levanon et al. |
| 2002/0183072 A1 | 12/2002 | Steinbach et al. |
| 2003/0050927 A1 | 3/2003 | Hussam |
| 2004/0008866 A1 | 1/2004 | Rhoads et al. |

FOREIGN PATENT DOCUMENTS

| | | |
|---|---|---|
| WO | WO 01/41000 | 6/2001 |
| WO | WO 01/98925 | 12/2001 |

OTHER PUBLICATIONS

Geospatial Imaging Solutions from SGI, product sheet.

* cited by examiner

*Primary Examiner*—Dao Phan
(74) *Attorney, Agent, or Firm*—Sacco & Associates, PA

(57) ABSTRACT

A method and system for tracking an object by generating GPS coordinates for the object and a bearing associated with a movement of the object. The GPS coordinates include a latitude, a longitude, and an altitude, which are processed. The GPS coordinates can be processed to correlate the altitude of the object with an identifier that identifies a level within a structure. An icon representing the object then can be accurately located in a first view of a three dimensional model. An indicator can be associated with the icon to indicate the object's level, a bearing of the object, and/or the object's GPS coordinates. The object's GPS coordinates can be compared with a second object location to determine dispatch instructions. The object can be a person, a vehicle, watercraft or an aircraft.

19 Claims, 2 Drawing Sheets

SYSTEM AND METHOD FOR HIGHLY ACCURATE REAL TIME TRACKING AND LOCATION IN THREE DIMENSIONS

BACKGROUND OF THE INVENTION

1. Statement of the Technical Field

The present invention relates to the field of geographic information systems (GIS) technology, and more particularly to a representation of an object being tracked in a three-dimensional geographic model.

2. Description of the Related Art

Computer-based object tracking systems have become available to provide object location and tracking information. For example, Automatic Vehicle Location (AVL) systems are available that utilize a Global Positioning System (GPS) to obtain data that can be used to monitor a vehicle location. The vehicle location data can be presented to a user at a monitoring station, typically via a computer interface. The user can monitor the vehicle location from the monitoring station.

In addition to a monitoring station, a typical AVL system commonly includes mobile units, a wireless communication network, and a computer system incorporating geographic information systems (GIS) technology. A mobile unit is a device that can be installed in a vehicle to enable the vehicle to be monitored and tracked, and typically includes a GPS receiver and a wireless transmitter. The mobile unit receives positioning signals from GPS satellites in the form of code sequences and converts these code sequences to pseudo range information or standard GPS code (NMEA). Pseudo ranges from a minimum of four different satellites are required in most instances for position calculation. These pseudo ranges or NMEA codes are subsequently transmitted via the wireless network to the monitoring station for position calculation.

The computer system incorporating GIS technology is usually equipped and configured to process GPS data and to monitor vehicle locations. The computer system performs filtering of the pseudo range signals or raw GPS data transmitted from the mobile units and further reduces these ranges into map coordinates for display. Current systems may also perform position corrections by using differential continuous positioning system (CPS) data obtained from a station in the vicinity of the vehicle being monitored.

Most conventional systems using GIS technology process GPS data according to two-dimensional (2D) spatial references. Still, conventional GIS technologies can be configured to process topographic data, in addition to rudimentary 2D data, usually in the form of a digital elevation model. Based upon the topographic data, isometric views and contour maps can be generated. Tracking system users, however, have recognized the limitations of a 2D modeling paradigm for modeling three-dimensional (3D) phenomena, even when combined with topographic data.

Notably, some GIS technologies can integrate scene generation systems for the 3D visualization of data, but the elevation coordinate data in these systems has been included only to "drape" a two-dimensional mapping over topographic data to produce what is known as a 2.5D model. Importantly, the use of a 2.5D model ought not to be confused with 3D. The elevation information in a 2.5D model is limited to the pre-determined elevation data for a geographic surface, such a road. Accordingly, application of 2.5D models is primarily limited to monitoring motor vehicles and the like.

Notably, in a 2.5D, one elevation is typically assigned for an entire structure. Hence, floors in multilevel structures, such as high rise office buildings and apartment buildings, cannot be accurately represented in a 2.5D model. Accordingly, the current tracking technology does not provide a means for tracking personnel, for example fire fighters, as the personnel travel between floors in a multilevel structure. Further, current tracking technology cannot provide accurate 3D images from various perspectives within a scene, for example, the view of a bank from the perspective of a police officer positioned on the roof of a building located across the street from the bank.

SUMMARY OF THE INVENTION

The present invention relates to a method and a system for tracking and locating objects and representing those objects as icons within a highly accurate three-dimensional (3D) model. The present invention tracks an object, such as a person, a vehicle, or an aircraft, by generating GPS coordinates for the object and a bearing associated with a movement of the object. In particular, the GPS coordinates include a latitude, a longitude, and an altitude. Importantly, the GPS coordinates can be processed to correlate the altitude of the object with an identifier that identifies a level within a structure. An icon representing the object then can be accurately located in a first view of a three dimensional model. Further, an indicator can be associated with the icon to indicate the object's level, a bearing of the object, and/or the object's GPS coordinates.

The GPS coordinates of the object also can be compared with a location of a second object to generate a comparison. The comparison can be processed to determine the content of a communication that is transmitted to the object, for example a dispatch message. The communication can be transmitted wirelessly to the object and can be encrypted prior to being transmitted. The object can be a person, a vehicle, a watercraft or an aircraft. Lastly, biological statistics, mechanical statistics, fuel level, speed, velocity and other parameters of the object can be monitored.

DETAILED DESCRIPTION OF THE PREFERRED EMBODIMENTS

The present invention relates to a method and a system for tracking and locating objects and representing those objects as icons within a highly accurate three-dimensional (3D) model. Importantly, the movements of various objects throughout an area can be monitored. For example, the locations and movements of police cruisers, helicopters, rescue vehicles, and personnel can be continually monitored throughout a city. More importantly, resources, such as personnel, can be accurately tracked when traveling through a city and, in particular, within multilevel structures. For example, fire fighters can be precisely located, tracked and monitored as they move about within a high rise structure during a structure fire. Further, police officers can be tracked as they give vehicle or foot chase to a criminal, for example in a multilevel parking garage.

In another arrangement of the present invention, accurate 3D images from the perspective of an object being tracked can be presented to a user. During a bank robbery, for example, a supervisor can view the bank from perspective of a police officer positioned on a roof near the bank. The perspective of other police officers at different positions around the bank also can be presented to the supervisor for improved situational awareness. Accordingly, supervisors and dispatchers are provided detailed information of a particular scenario which can be used to better evaluate existing circumstances, thereby leading to a better decision making process and improved resource allocations, both of which improve public service.

Figure 1:
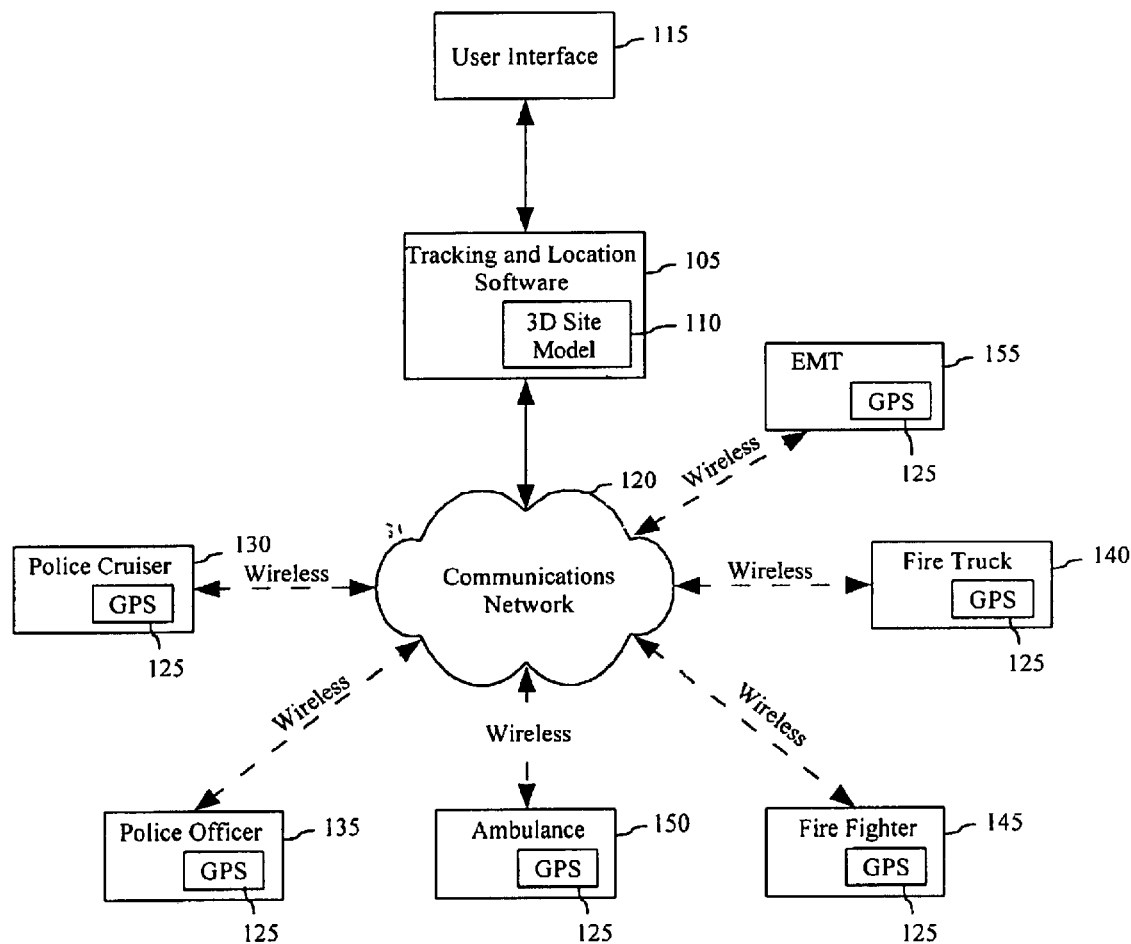
FIG. 1 is a block diagram of a system for tracking and locating objects within a highly accurate three dimensional model in accordance with the present invention.

Referring to FIG. 1, a block diagram 100 of a system for tracking and locating objects within a highly accurate three dimensional model is shown. The system includes tracking and location (T & L) software 105, 3D mapping software (3D site model) 110, and a user interface 115. Further, each object being tracked can include a global positioning satellite (GPS) receiver 125. For example, there can be a GPS receiver 125 in a police cruiser 130, on a police officer 135, in a fire truck 140, on a fire fighter 145, in an ambulance 150, or on an emergency medical technician 155. Still, many other objects can carry a GPS receiver 125 to enable object tracking of manned and unmanned objects. Other examples include trains, aircraft (helicopters, fixed wing, etc.), watercraft and so on.

Each GPS receiver can be connected to a transmitter to transmit GPS coordinates to the T & L software 105 using the communications network 120. For example, in the case where a GPS receiver is in a vehicle, the GPS receiver can connect to existing RF transmission equipment, such as a police radio. If a GPS receiver is being carried on a person, however, the GPS receiver can include a transmitter. In another arrangement, a GPS receiver can integrate with a cell phone or a mobile radio. Or it can integrate with other communications devices including those operating on radio frequencies or optical wavelengths.

The T & L software 105 can receive an object's latitude, longitude and altitude coordinates, and bearing data from a GPS receiver associated with the object. The T & L software 105 then can place an icon representing the object into a 3D site model 110 that is presented to a user through the user interface 115, for example on a video monitor. Importantly, an indicator can be presented in the icon or associated with the icon to indicate the bearing of the object. For example, a velocity of the object can be presented, indicating both the speed at which an object is moving and the direction the object is moving in. In particular, an arrow can be presented with the icon to indicate a direction the object is moving. The direction also can be presented numerically or graphically. For example, degrees can be indicated numerically or with a compass style indicator. The speed at which the object is moving also can be presented numerically or graphically. For example, speed can be indicated numerically or with an icon that represents a speedometer display. An indicator also can be associated with the icon to indicate the GPS coordinates of the object.

The 3D site model 110 can be an accurate model of an area incorporating geographic features and structures. For example, the 3D site model 110 can be a model of a city, including roads, bridges, structures, etc. The 3D model can be generated using techniques known to the skilled artisan. For example, source imagery can be used to generate polygons representing features and structures to be shown in the 3D site model 110. Notably, the source imagery can be any form of feature identification, for example information generated by aerial and satellite photography, electro-optical imaging, infrared detection, synthetic aperture radar (SAR), hyperspectral imaging, light detection and ranging (LIDAR), and even handheld photographs. The model resulting from the polygons then can be shaded and textured to provide a photo-realistic and accurate representation of the area.

A database can be associated with the 3D site model and structures in the 3D site model 110 can be assigned attributes. For example, the composition of structures can be identified. Special features and comments related to a structure also can be noted, for example, whether a structure has a basement, the age of a structure, whether a structure has a fire escape and/or sprinkler system, and so on. In one arrangement, the internal layout of particular structures can be incorporated in the 3D site model 110, for example, the elevation (altitude) of each floor and the location of stair wells and elevators within the structure. Moreover, the database can be structured in a manner wherein the attributes associated with each building are organized by floor or altitude.

The T & L software 105 can be stored on a data storage device, such as a data storage associated with a computer system. For example, the T & L software 105 can be stored on a magnetic storage medium, an optical storage medium, a magneto-optical medium, etc. The T & L software 105 can be executed on a computer or any other device incorporating a processor capable of processing 3D graphical information. For example the T & L software 105 can be executed on a server, a workstation, a personal computer, a laptop computer, a mobile computer, a hand held computer, a body worn computer, etc.

As previously noted, a communications network 120 can be used by a GPS 125 to communicate GPS data to the T & L software 105. The communications network can include the Internet, a wide area network (WAN), a local area network (LAN), a mobile communications network, a public switched telephone network, or any other network capable of transmitting GPS data. For example, the GPS receivers 125 can communicate via a wireless network, such as a cellular communications network or an IEEE 802.11 network. Importantly, the communications network 120 can include a myriad of systems capable of transmitting GPS data.

A user, for example a supervisor or a dispatcher, can use the user interface 115 to interact with the T & L software 105. For example, the user interface can comprise a display, a keyboard, and a mouse. However, the user interface is not limited to these devices. For example, the user interface can include a projector, a joystick, speech recognition hardware and software, speakers, and any other device a user can use to interact with a software package.

Figure 2:
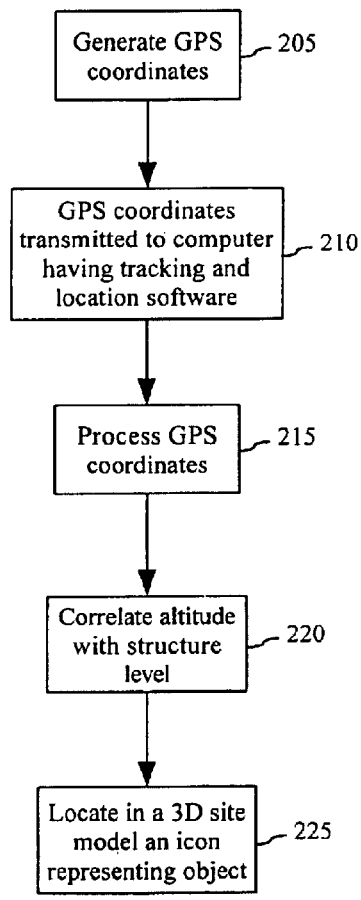
FIG. 2 is a flow chart for tracking and locating objects within a highly accurate three dimensional model in accordance with the present invention.

FIG. 2 is a flow chart 200 for tracking and locating an object within a highly accurate three dimensional model. Referring to step 205, GPS data for the object can be generated by a GPS receiver 125 and transmitted to the T & L software 105, as previously noted. For example, the GPS data can be transmitted to a computer having the tracking and location software, as shown in step 210. For example, the GPS data can be wirelessly transmitted from the GPS receiver to a basestation, which can wireline transmit the GPS data to the computer. Still, other transmission techniques can be used, as is well known to the skilled artisan.

Referring to step 215, the computer can pass the GPS data to the T & L software 105, which can process the GPS data and select a 3D site model correlating to the GPS data. For example, a 3D site model can be selected for a particular city or a particular area within a city. Importantly, when the latitude and longitude coordinates correspond to the location of a multilevel structure, the altitude coordinate can be resolved into a floor or level designation, as shown in step 220. For example, if a fire fighter is at an altitude of 100 feet in a particular structure, the altitude can be cross referenced to the attributes associated with the structure in the 3D site model to determine an accurate floor number correlating to that altitude. Referring to step 225, an icon representing the object can be accurately located in the 3D site model at the location identified by the GPS data received from the GPS receiver 125. The icon can be located in the 3D site model using a coordinate system employed by the T & L software 105, as is known to those skilled in the art of tracking and location software. For example, the latitude, longitude and altitude coordinates can be translated into X, Y and Z coordinates within the T & L software's local space coordinate system using geospatial to local space coordinate system software. Further, an indicator, such as a number, letter or symbol, can be associated with the icon to indicate a floor number or level. As previously noted, the indicator also can indicate the object's GPS coordinates and bearing data.

In a further arrangement, accurate 3D images from the perspective of an object being tracked can be presented via the user interface, for example to a supervisor or planner. The GPS data for an object can be processed by the T & L software 105, which can then access the selected 3D site model. The T & L software 105 then can display through the user interface the portions of the 3D site model correlating to the actual scene that is viewable from the objects vantage point. For example, a user can use a cursor to select an object in a 3D site model being displayed or the user can toggle through any tracked object being displayed to select one to be "active." When an object is selected, the user can be provided with a selection of vantage points within the 3D site model that correlate to the perspective as would be seen by a person located where the selected object is located. Additional vantage points can be presented as well. For example, a top view of an object moving through a scene, an overhead "chase" view from a perspective that is behind and slightly above an object and which follows the object through a scene, a rear "chase" view from a perspective behind the object, and so on. Notably, there are a myriad of views and perspectives which can be displayed. All such arrangements will be understood to be included in the present invention.

When a vantage point is selected, that vantage point can be displayed in the current window, in a second window, or on a different display. Further, user selectable icons can be provided on the display to enable the user to pan, zoom and quickly change vantage points within the 3D site model. These features can be of utmost importance in real-time scenarios, such as natural disasters, structure fires, hostage situations, police chases, acts of terror, etc. Additional user options can be provided as well. For example, data related to the selected (active) object can be displayed on the screen. For example, if the selected object is a fire truck, data associated with the fire truck can be provided on the display.

The T & L software 105 also can monitor parameters associated with an object. For example, the T & L software 105 can monitor biological statistics of a person, such as pulse, respiration, body temperature, brain activity, and so on. For example, a fire fighter can be equipped with pulse, respiration, and body temperature measuring devices. The T & L software 105 also can monitor operational parameters for objects that are machines, such as vehicles, aircraft, watercraft, etc. For example, mechanical statistics, such as mechanical stresses, tire pressure, oil pressure, fuel level, speed, velocity, and other parameters can be measured using sensors that are known in the art. Data generated by the monitoring devices can be transmitted to the T & L software 105 using the same transmitter used for transmission of the GPS data. Alternatively, a separate transmitter can be provided to transmit the parameter measurement data.

Figure 3:
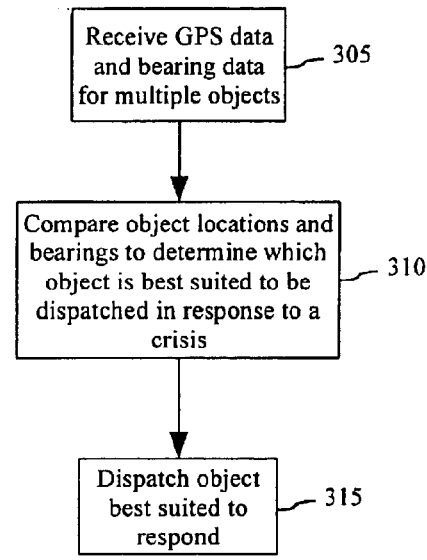
FIG. 3 is a flow chart for providing dynamically adjusted computer aided dispatch based on object location in accordance with the present invention.

FIG. 3 is a flow chart 300 for providing dynamically adjustable computer aided dispatch based on object location. Referring to step 305, The T & L software 105 can receive GPS data (coordinates and bearing) for multiple objects being monitored. Referring to step 310, the coordinates and bearings of different objects can be evaluated to determine which object is best suited to be dispatched in response to a crisis or need. For example, a comparison of the position of various objects can be generated and evaluated to select an object to dispatch. In one arrangement, other information can be evaluated as well for determining which object to dispatch. For example, evaluation can be based on the size of the ladder on a fire truck, the resources allocated for other crises, emergencies or events, and other factors that can effect the dispatch decisions.

The T & L software 105 then can provide to a dispatcher a recommendation for which object to allocate to a particular crisis, emergency or event, as shown in step 315. The dispatcher then can transmit a communication to the object with dispatch instructions. In an alternate arrangement, the T & L software 105 can automatically transmit a communication with dispatch instructions to the object. The communication can be sent over the communications network 120 and can be encrypted using known security techniques.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A method for tracking an object, comprising:
   generating GPS coordinates for the object, said GPS coordinates comprising a latitude, a longitude, and an altitude;
   correlating said altitude with an identifier for a level within a multi-level structure;
   accurately locating an icon representing said object in a first view of a three dimensional model, wherein said three dimensional model represents at least a portion of said multi-level structure; and
   displaying an indicator to indicate said level.

2. The method of claim 1, further comprising the steps of:
   processing said GPS coordinates to determine a bearing representing a movement of said object; and
   displaying an indicator that indicates said bearing.

3. The method of claim 1, further comprising the step of selectively presenting a second view of said three dimensional model, said second view being presented from a perspective correlating to a location of said object determined by said GPS coordinates.

4. The method of claim 1, further comprising the steps of:
   comparing said GPS coordinates for said object with a location of a second object; and selectively transmitting a communication to one of said objects based on said comparison.

5. The method of claim 4 wherein said transmitting step further comprises transmitting a dispatch command.

6. The method of claim 4 wherein said comparing step further comprises comparing at least one parameter of said objects prior to said transmitting step.

7. The method of claim 6 wherein said parameter in said comparing step is selected from the group consisting of physiological data and object readiness data.

8. The method of claim 1, wherein said object is selected from the group consisting of a person, a vehicle, a watercraft and an aircraft.

9. The method of claim 1, further comprising the step of monitoring a parameter of said object.

10. The method of claim 9, wherein said parameter is selected from the group consisting of biological statistics, mechanical statistics, fuel level, acceleration, and velocity.

11. An object tracking system, comprising:
- at least one GPS receiver generating GPS coordinates for an object and a bearing representing a movement of said object, said GPS coordinates comprising a latitude, a longitude, and an altitude;
- a processor for processing said GPS coordinates and correlating said altitude with an identifier for a level within a multi-level structure; and
- a three dimensional tracking system for accurately locating an icon representing said object in a first view of a three dimensional model, wherein said three dimensional model represents at least a portion of said muiti-level structure, said three dimensional tracking system also displaying an indicator to indicate said level.

12. The system of claim 11, said tracking system further displaying an indicator to indicate said bearing.

13. The system of claim 11, said tracking system further presenting a second view of said three dimensional model, said second view being presented from a perspective correlating to a present location of said object.

14. The system of claim 11, further comprising:
- means for comparing said GPS coordinates of said object to a location of a second object to generate a comparison; and
- means for transmitting a communication to said object, wherein a content of said communication is determined at least in part by said comparison.

15. The system of claim 14, wherein said transmitting means wirelessly transmits said communication to said object.

16. The system of claim 14, further comprising means for encrypting said communication.

17. The system of claim 11, wherein said object is selected from the group consisting of a person, a vehicle, a watercraft and an aircraft.

18. The system of claim 11, further comprising means for monitoring a parameter of said object.

19. The system of claim 18, wherein said parameter is selected from the group consisting of biological statistics, mechanical statistics, fuel level, acceleration, and velocity.

* * * * *

UNITED STATES PATENT AND TRADEMARK OFFICE
Certificate

Patent No. 6,833,811 B2            Patented: December 21, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael P. Zeitfuss, Satellite Beach, FL; Joseph M. Nemethy, West Melbourne, FL; Joseph A. Venezia, Melbourne, FL; and Shawn Gallagher, Palm Bay, FL.

Signed and Sealed this Fourteenth Day of February 2006.

THOMAS H. TARCZA
*Supervisory Patent Examiner*
Art Unit 3662